United States Patent
Van Rest et al.

(10) Patent No.: US 11,256,750 B2
(45) Date of Patent: *Feb. 22, 2022

(54) FAST GRAPH QUERY ENGINE OPTIMIZED FOR TYPICAL REAL-WORLD GRAPH INSTANCES WHOSE SMALL PORTION OF VERTICES HAVE EXTREMELY LARGE DEGREE

(71) Applicant: ORACLE INTERNATIONAL CORPORATION, Redwood Shores, CA (US)

(72) Inventors: Oskar Van Rest, Mountain View, CA (US); Jinha Kim, Sunnyvale, CA (US); Xuming Meng, Belmont, CA (US); Sungpack Hong, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/540,605

(22) Filed: Aug. 14, 2019

(65) Prior Publication Data
US 2019/0370289 A1    Dec. 5, 2019

Related U.S. Application Data

(63) Continuation of application No. 15/409,091, filed on Jan. 18, 2017, now Pat. No. 10,423,663.

(51) Int. Cl.
*G06F 16/00* (2019.01)
*G06F 16/901* (2019.01)

(52) U.S. Cl.
CPC ................. *G06F 16/9024* (2019.01)

(58) Field of Classification Search
None
See application file for complete search history.

(56) References Cited

U.S. PATENT DOCUMENTS

| 5,717,890 A * | 2/1998 | Ichida ................. G06F 12/0804 711/122 |
| 8,910,134 B2 * | 12/2014 | Hong ...................... G06F 8/443 717/151 |

(Continued)

OTHER PUBLICATIONS

Wang, Yangzihao, Yuechao Pan, Andrew Davidson, Yuduo Wu, Carl Yang, Leyuan Wang, Muhammad Osama et al. "Gunrock: GPU graph analytics." ACM Transactions on Parallel Computing (TOPC) 4, No. 1 (2017): 1-49. (Year: 2017).*

(Continued)

*Primary Examiner* — Farhan M Syed
(74) *Attorney, Agent, or Firm* — Hickman Becker Bingham Ledesma LLP

(57) ABSTRACT

Techniques herein accelerate graph querying by caching neighbor vertices (NVs) of super-node vertices. In an embodiment, a computer receives a graph query (GQ) to extract result paths from a graph in a database. The GQ has a sequence of query vertices (QVs) and a sequence of query edges (QEs). The computer successively traverses each QE and QV to detect paths of the graph that match the GQ. Traversing each QE and QV entails retrieving NVs of a current graph vertex (CGV) of a current traversal path. If the CGV is a key in a cache whose keys are graph vertices having an excessive degree, then the computer retrieves NVs from the cache. Otherwise, the computer retrieves NVs from the database. If the degree is excessive, and the CGV is not a key in the cache, then the computer stores, into the cache, the CGV as a key for the NVs.

20 Claims, 5 Drawing Sheets

(56) References Cited

U.S. PATENT DOCUMENTS

| | | | | |
|---|---|---|---|---|
| 9,172,636 | B2* | 10/2015 | Agarwal | H04L 45/14 |
| 9,405,748 | B2* | 8/2016 | Glover | G06F 16/9024 |
| 9,405,855 | B2* | 8/2016 | Vasilyeva | G06F 16/9024 |
| 9,779,207 | B2* | 10/2017 | Ishii | G16B 40/00 |
| 2013/0227336 | A1* | 8/2013 | Agarwal | H04L 45/22 714/4.3 |
| 2013/0232140 | A1* | 9/2013 | Ishii | G06F 16/35 707/723 |
| 2014/0189665 | A1* | 7/2014 | Hong | G06F 8/443 717/151 |
| 2015/0112986 | A1* | 4/2015 | Jin | G06F 16/9024 707/736 |
| 2015/0324404 | A1* | 11/2015 | Glover | G06F 16/2291 707/798 |
| 2015/0324410 | A1* | 11/2015 | Glover | G06F 16/9024 707/610 |
| 2015/0370838 | A1* | 12/2015 | Paradies | G06F 16/9024 707/738 |
| 2015/0381515 | A1* | 12/2015 | Mattson | H04L 47/70 707/609 |
| 2016/0110434 | A1* | 4/2016 | Kakaraddi | G06F 11/3006 707/602 |
| 2017/0169133 | A1* | 6/2017 | Kim | G06F 16/2237 |
| 2017/0364534 | A1* | 12/2017 | Zhang | G06N 5/04 |
| 2018/0060448 | A1* | 3/2018 | Miyamoto | G06F 16/00 |
| 2018/0203897 | A1 | 7/2018 | Van Rest | |
| 2019/0121810 | A1* | 4/2019 | Zhuang | G06F 16/254 |

OTHER PUBLICATIONS

Roth, Nicholas P., Vasileios Trigonakis, Sungpack Hong, Hassan Chafi, Anthony Potter, Boris Motik, and Ian Horrocks. "Pgx. d/async: A scalable distributed graph pattern matching engine." In Proceedings of the Fifth International Workshop on Graph Data-management Experiences & Systems, pp. 1-6. 2017. (Year: 2017).*

Kyrola, Aapo. "Drunkardmob: billions of random walks on just a pc." In Proceedings of the 7th ACM conference on Recommender systems, pp. 257-264. 2013. (Year: 2013).*

Quinn, Nick, "Making Sense of the Graph Revolution", ww.JAXenter.com | Sep. 2013, 12 pages.

DataStax, "A Solution to the Supernode Problem", https://www.datastax.com/dev/blog/asolutiontothesupernodeproblem, dated Oct. 25, 2012, 6 pages.

Rest, U.S. Appl. No. 15/409,091, filed Jan. 18, 2017, Office Action dated Oct. 18, 2018.

Rest, U.S. Appl. No. 15/409,091, filed Jan. 18, 2017, Notice of Allowance dated May 14, 2019.

Rest, U.S. Appl. No. 15/409,091, filed Jan. 18, 2017, Interview Summary, dated Dec. 18, 2018.

* cited by examiner

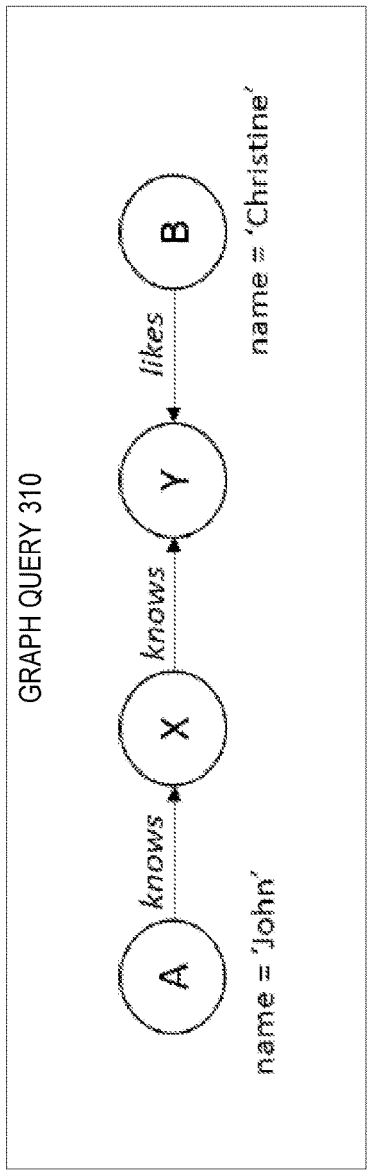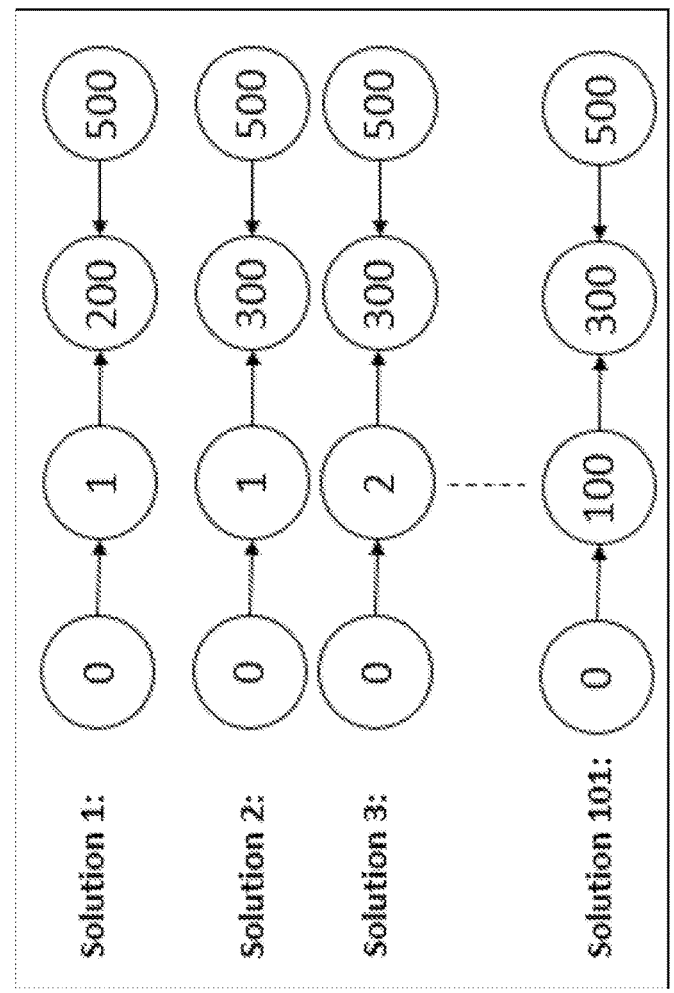
FIG. 3

FAST GRAPH QUERY ENGINE OPTIMIZED FOR TYPICAL REAL-WORLD GRAPH INSTANCES WHOSE SMALL PORTION OF VERTICES HAVE EXTREMELY LARGE DEGREE

PRIORITY CLAIM; RELATED APPLICATION

This application claims the benefit as a continuation of U.S. patent application Ser. No. 15/409,091, filed Jan. 18, 2017, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

This disclosure relates to graph query processing. Techniques are presented for accelerating graph querying by caching neighbor vertices of super-node vertices of excessive degree.

BACKGROUND

A logical graph is a powerful data model for data analytics, which allows analyzing the relationships between data entities, such as vertices and edges. A graph query is a patterned request to find a subset of the graph that satisfies (matches) the query. For example, a graph may be a continental road atlas, and a graph query may be a request to find all driving routes that stretch from the east coast to the west coast of the continent.

In graph theory, a super node is a vertex that has a disproportionately high number of incident edges. In practice, most large graphs have some super nodes. For example within a social graph (network), an ordinary person may be connected to a few people. Whereas, a famous or important person may be connected to thousands of people.

Another example is a call graph that represents calls to functions within a software codebase. A call graph often has a very large number of invocations (edges) that connect to functions (vertices) of a standard library or to functions that implement a core functionality of a software application.

When processing graph queries however, a significant portion of execution time, space (memory), and energy may be spent processing the few super nodes of a graph. These costs may be aggravated because graph query processing may repeatedly visit the same vertices. Each visitation of a super node may be very costly because a super node has so many edges and neighboring vertices.

Industry attempted to solve this problem by creating indices over the graph data that facilitates rapid access for some incident edges that are relevant to a particular query. Typically, such an index groups the incident edges of a vertex by edge labels, in case a query specifies traversing only over edges having a specific label.

A problem with such an approach is that it is too inflexible to apply it to arbitrary cases that have queries with all kinds of predicates over edges and vertices, and not just predicates over labels of edges. For each predicate, a separate index is required. However, which kind of predicates a user may specify in a graph query may be unpredictable, such as with ad hoc queries. In theory, indices for all the possible predicate types may be exhaustively created. However, this is impractical because indices cost a lot of (memory or disk) space and also take time to build.

In a property graph data model, edges and vertices may have labels and an arbitrary number of properties, which may be implemented as name-value pairs. Predicates may involve many properties and labels. Indeed, there may be a combinatorial (polynomial) amount of potential predicates for a particular graph. This may thwart scalability and make the index approach infeasible in the wild (in practice). Another problem with the index approach is that if a graph mutates (changes), then the indices may need updating, which is expensive.

BRIEF DESCRIPTION OF THE DRAWINGS

In the drawings:

FIG. 3 is a block diagram that depicts an example graph query, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Example Computer System
      2.1 Database
      2.2 Graph
         2.2.1 Properties
         2.2.2 Example Graph
      2.3 Query
         2.3.1 Example Query
      2.4 Traversal
         2.4.1 Revisiting
      2.5 Super Node
      2.6 Cache
         2.6.1 Key
         2.6.2 Values
      2.7 Thresholds
   3.0 Cache Process
      3.1 Preparation
      3.2 Traversal
      3.3 Population
      3.4 Cross Constraint
      3.5 Lifecycle
      3.6 Example Logic
   4.0 Hardware Overview

1. General Overview

Techniques are provided for accelerating graph querying by caching neighbor vertices of super-node vertices of excessive degree. In an embodiment, a computer receives a graph query to extract result paths from a graph stored in a database. The graph has graph vertices that are interconnected by graph edges. Each vertex has vertex properties. Each edge has edge properties. The graph query has a sequence of query vertices and a sequence of query edges. Each graph edge is associated with a source vertex and a destination vertex. The computer successively traverses each query edge and query vertex of the graph query to detect paths having graph vertices and graph edges of the graph that match the graph query. Traversing each query edge and query vertex entails retrieving neighbor vertices of a current graph vertex of a current traversal path. If the current graph vertex is a key in a cache whose keys are graph vertices having a degree that exceeds a threshold, then the computer quickly retrieves neighbor vertices from the cache. Otherwise, the computer retrieves neighbor vertices from the database, which has high (bad) latency. If the degree exceeds the threshold, and the current graph vertex is not a key in the cache, then the computer stores, into the cache, the current graph vertex as a key for the neighbor vertices and/or edges.

2.0 Example Computer System

Figure 1:
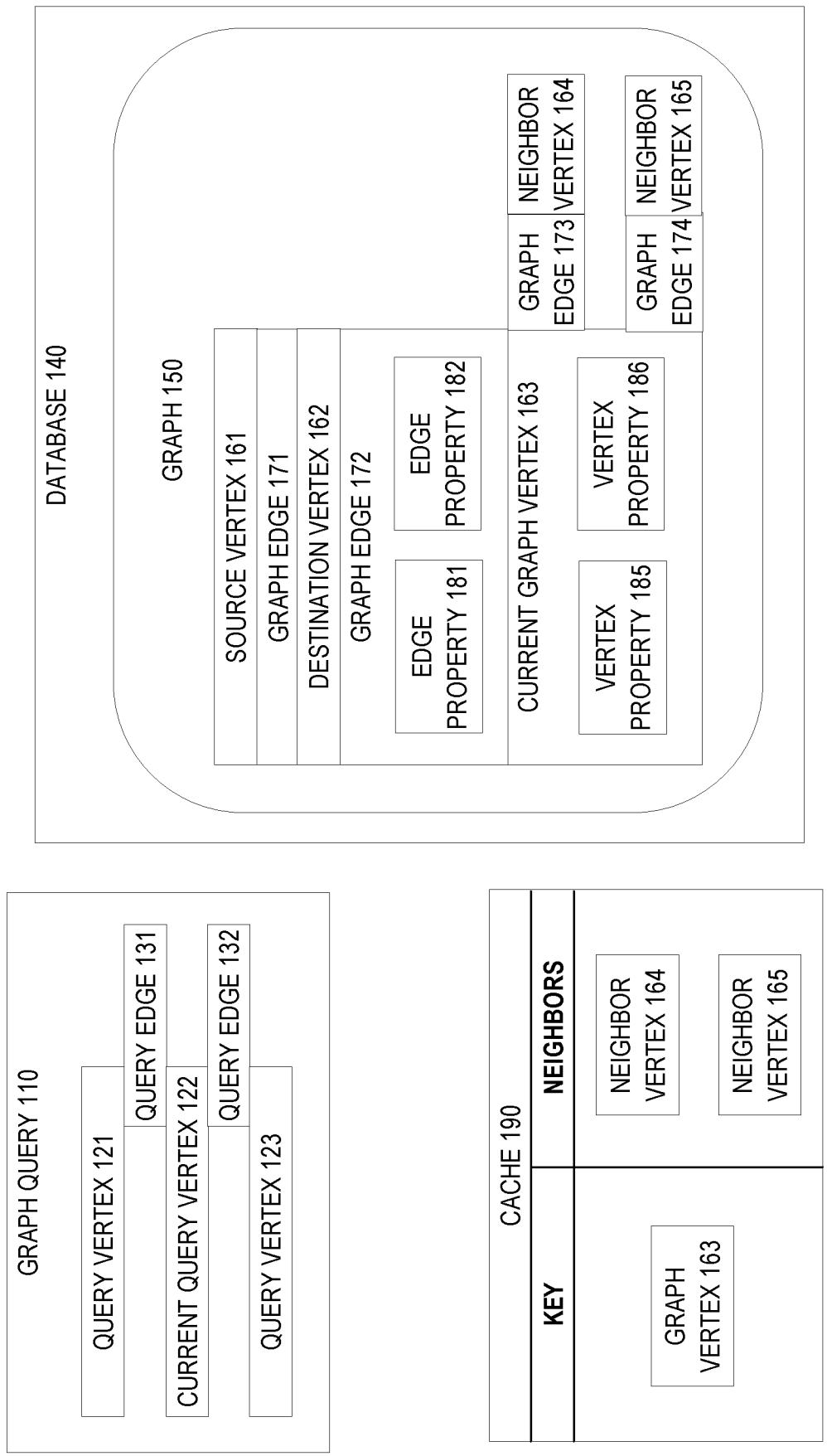
FIG. 1 is a block diagram that depicts an example computer system that accelerates graph querying by caching neighbor vertices of super-node vertices of excessive degree, in an embodiment.

FIG. 1 is a block diagram that depicts an example computer system 100, in an embodiment. Computer system 100 accelerates graph querying by caching neighbor vertices of super-node vertices of excessive degree.

Computer system 100 may be composed of one or more computers, including rack servers such as blades, personal computers, mainframes, network appliances, virtual machines, smartphones, or other computing devices. Computer system 100 may access data that is stored in memory, on disks, or over a network.

2.1 Database

Computer system 100 includes database 140, which may be a graph database, a relational database, a columnar database, a tuple store, a resource description framework (RDF) triplestore, a key-value store, or other data store capable of storing the content of a logical graph, such as 150. Database 140 may be hosted by a database management system (DBMS) or other middleware that may endow database 140 with administrative or transactional behavior. Database 140 may store additional graphs (not shown).

2.2 Graph

Graph 150 is composed of graph vertices, such as 161-165, that are interconnected by graph edges such as 171-174. Graph 150 may be connected or disconnected. Graph 150 may be cyclic or acyclic.

Each of graph edges 171-174 connects two graph vertices, which in some cases may be a same vertex. For example, graph edge 172 connects vertices 162-163.

Graph edges 171-174 may be directed or undirected. A directed edge originates at a source vertex and terminates at a destination vertex. For example, graph edge 171 originates at source vertex 161 and terminates at destination vertex 162.

A graph vertex may have multiple edges that connect to neighboring vertices. For example, current graph vertex 163 has graph edges 173-174 that connect to neighbor vertices 164-165. Depending on the direction of edges 173-174, they may represent fan-in or fan-out at vertex 163.

Graph 150 may be too big to store in memory. Indeed, the techniques herein reduce the cost of traversing a graph 150 that is incrementally retrieved from disk or network and not retained in memory. For example, these graph traversal techniques may reduce the range of address space needed, reduce virtual memory swapping, and generally reduce input/output (I/O).

Graph 150 may be immense. For example in year 2014, an Oracle Exadata machine processed a query against an RDF graph having a trillion edges.

2.2.1 Properties

Each graph vertex may have a set of vertex properties. For example, current graph vertex 163 has vertex properties 185-186.

Each graph edge may have a set of edge properties. For example, graph edge 172 has edge properties 181-182.

A (vertex or edge) property may have a name (key) and a value. For example, edge property 181 may be named "length" and have a value of "five miles."

A property may simply be a label, which may be a name without a value. For example, vertex property 185 may be labeled "temporary."

Property names may be shared by vertices and/or edges. For example, all edges may have a property named 'weight'.

Not all vertices and/or edges need to have a property of a same name. For example, some edges may lack a weight property.

2.2.2 Example Graph

Figure 2:
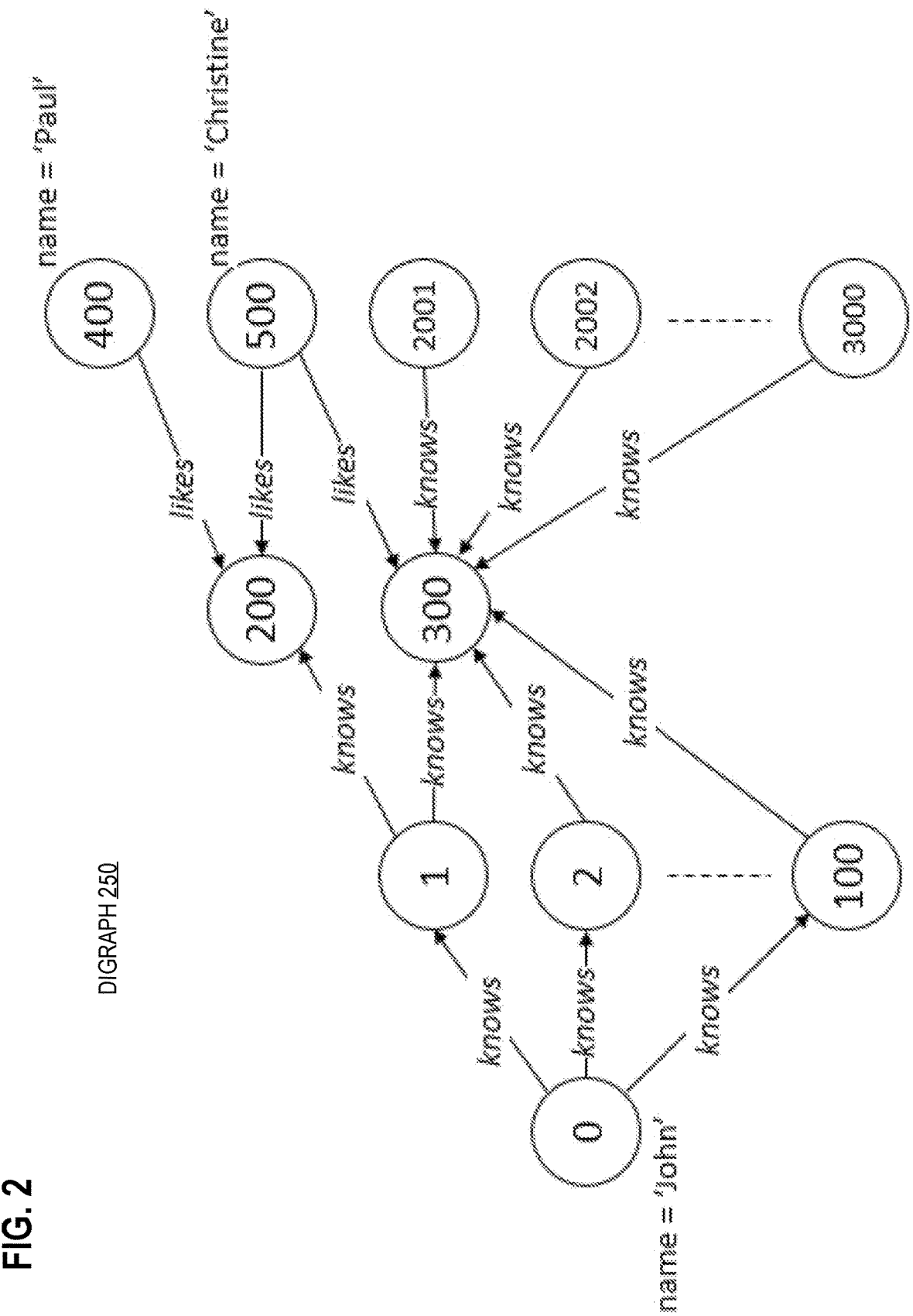
FIG. 2 is a block diagram that depicts an example directed graph, in an embodiment.

With discussion of FIG. 1 ongoing, FIG. 2 shows example digraph (directed graph) 250 which may be an implementation of graph 150 and has over 3,000 vertices. The vertices and edges of digraph 250 have labels. Some vertices (0, 400, and 500) have a "name" property.

2.3 Query

In operation, computer system 100 receives or generates graph query 110 to extract subgraphs from graph 150. Graph query 110 may be declarative or idempotent. For example, graph 110 or database 140 may be read only. Such aspects allow graph query 110 to be decomposed and distributed without compromising correctness.

Graph query 110 may conform to a query grammar such as structured query language (SQL), Cypher, Sparql, XPath, cascading style sheet (CSS) such as a selector, or JavaScript. Depending on its query language, graph query 110 may specify pattern matching according to a regular expression, such as a conjunctive regular path query or a context-free path query.

Graph query 110 may specify an example subgraph to match against graph 150. For example, graph query 110 may contain query vertices 121-123 and query edges 131-132 that may define an example subgraph.

A precise structural alignment of query vertices 121-123 and query edges 131-132 depends on an embodiment. For example, graph query 110 may arrange query vertices 121-123 in one contiguous list and query edges 131-132 in another contiguous list.

Alternatively, graph query 110 may comingle query vertices 12-123 and query edges 131-132 within a single list. For example, the ordering of components within the list may be vertex 121, edge 131, vertex 122, edge 132, vertex 123, which alternates vertex and edge as shown vertically in graph query 110.

2.3.1 Example Query

With discussion of FIG. 1 ongoing, FIG. 3 shows example graph query 310 to be executed against digraph 250. Graph query 310 contains query vertices A, B, X, and Y that are connected by three labeled query edges. Graph query 310 may be an implementation of graph query 110.

Query vertex A matches any vertex of digraph 250 that has a "name" property with a value of "John". Multiple graph vertices may match query vertex A.

However in this example, only graph vertex 0 matches query vertex A. Thus in this example, all result paths that match graph query 310 must start at graph vertex 0.

For example, all of the result paths (solutions 1-101) of FIG. 3 start at graph vertex 0. All of solutions 1-101 satisfy (match) graph query 310.

Graph query 310 also specifies query edges that are labeled and directed (arrowheads). Solutions 1-101 should also satisfy these labels and directions.

Query vertices X and Y are unconstrained. Thus, only their positions (between two particular query edges) is significant for matching. That is, any graph vertex may match query vertex X or Y, so long as the graph vertex has an inbound edge and outbound edge that match the corresponding query edges.

2.4 Traversal

For example in FIG. 1, graph query 110 may express an example graph traversal path. For example graph query 110 may match zero or more paths within graph 150 that start with a graph vertex that matches query vertex 121 and ends with a graph vertex that matches query vertex 123.

For a path to match graph query 110, the path must match all of the query vertices and query edges of graph query 110. For example, graph query 110 may match a path that traverses from vertex 162 to vertex 165. Whereas, graph query 110 might not match another path that traverses from vertex 162 to vertex 164.

In operation, computer system 100 may explore graph 150 by traversing graph edges to discover paths that match graph query 110. For example, computer system 100 may perform a breadth-first search or a depth-first search to traverse graph 150 in fulfilment of graph query 110.

In FIG. 3, traversal of query vertices and edges of graph query 310 may occur from left to right (or vice versa), regardless of what are the directions of the query edges. For example, the query edge labeled "likes" of graph query 310 points in the opposite direction of the other query edges.

In this sense, traversal of graph query 310 and digraph 250 may enforce direction when matching a graph edge to a query edge, but may ignore direction to traverse a graph edge that matches. For example, traversal of digraph 250 may proceed from graph vertex 300 to graph vertex 500 even though the "likes" graph edge points (is directed) against such traversal.

2.4.1 Revisiting

In FIG. 1, such traversal may repeatedly visit a same graph vertex while executing graph query 110. For example, revisiting may occur if graph 150 is cyclic.

However, revisiting need not occur during traversal of a same path. For example, multiple paths that share a graph vertex may be considered for graph query 110.

For example, revisiting may occur during traversal backtracking, such as during a depth first search. Alternatively, revisiting may occur if a graph vertex has fan-in.

Re-visitation implies duplicate (redundant) processing of the revisited graph vertex, its edges, and its neighbor vertices. Such redundant processing may waste time, energy, or memory.

2.5 Super Node

The cost of re-visitation may be proportional to the degree (how much fan in/out) of a graph vertex. That is, the more edges and neighbors a graph vertex has, the higher is the penalty for revisiting it.

Furthermore, there may be discontinuity or other nonlinearity in the ratio of cost to edges or neighbors. For example, revisiting a graph vertex with an excessive degree may cause virtual memory swapping that does not occur when revisiting vertices of lesser degree.

At the extreme are super nodes, which are graph vertices that have more edges or neighbors than can be processed efficiently. In an embodiment, a graph vertex having a degree that exceeds a threshold is a super node. The value of the threshold may be dynamically tunable and/or experimentally optimized.

In embodiments, the threshold is compared against the fan out (out degree) of the current graph vertex. In embodiments, the threshold is compared against the sum of fan out and fan in of the current graph vertex.

For example in FIG. 2 if the threshold is five, then graph vertex 300 of digraph 250 is a super node because it has seven edges. Whereas, graph vertex 200 is not a super node because it has only three (inbound and outbound) edges.

2.6 Cache

In FIG. 1 computer system 100 may reduce the cost of revisiting super nodes by reducing I/O for retrieving portions of graph 150. Cache 190 stores the neighbors and/or edges of super nodes, thereby making revisiting super nodes as low or lower cost as revisiting other vertices.

Cache 190 occupies memory. In embodiments, database 140 stores some or all properties of edges or vertices in relational tables that are not indexed or are costly to scan.

Graph traversal, such as by breadth- or depth-first search, entails visiting a current graph vertex, such as 163, iteratively traversing its edges, such as 172-174, and recursively visiting its neighbors, such as 162 and 164-165. When visiting an edge or neighbor, its properties may be inspected and compared to those of a corresponding query edge or query vertex of graph query 110 to decide whether the edge or neighbor may be part of a path that matches graph query 110 or whether the edge or neighbor does not match and should be avoided during traversal.

2.6.1 Key

The neighbors and/or edges and their properties may be stored in cache 190 and keyed by whichever super node is the current graph vertex, such as 163, at that time during graph traversal. Although only one graph vertex is shown as a key within cache 190, more graph vertices may be stored as additional keys with other neighbors or edges.

When a super node is revisited, traversal of its edges to its neighbors may avoid I/O by retrieving these edges or neighbors from cache 190.

In embodiments, cache 190 stores only neighbors, only edges, or both for each super node stored as a key. In embodiments, cache 190 has a least recently used (LRU) eviction policy.

2.6.2 Values

In embodiments, only matching neighbors or edges are stored in cache 190 for each key. For example if a super node matches current query vertex 122, then instead of cache 190 storing all neighbors or edges of the super node, cache 190 stores only those edges of the super node that actually match query edge 132 or those neighbors that match query vertex 123.

In embodiments, only matching neighbors or edges are stored in cache 190 when traversal allows backtracking, such as for depth first search. In embodiments, such as with breadth first search, only matching neighbors or edges are stored in cache 190, and cache 190 has compound keys that contain a super node and a query vertex that corresponds to the super node. In embodiments, only a subset of neighbor or edge properties are stored in cache 190.

In embodiments, the capacity of cache 190 is dynamically tunable, experimentally optimized, or based on available memory. However, a super node having an extremely high degree may have an amount of neighbors or edges that exceed the capacity of cache 190 or otherwise cause thrashing of cache 190.

2.7 Thresholds

Caching an extreme super node may be avoided. In embodiments, a super node is not cached if its degree exceeds a threshold.

Thus, embodiments may have two super node thresholds. A graph vertex is a super node only if its degree exceeds a first threshold.

Likewise, a super node is not cacheable if its degree exceeds a second threshold. In embodiments, either or both thresholds may depend on available (unused) memory capacity, observed virtual memory swap throughput, or the size (vertex or edge count) of graph 150.

3.0 Cache Process

Figure 4:
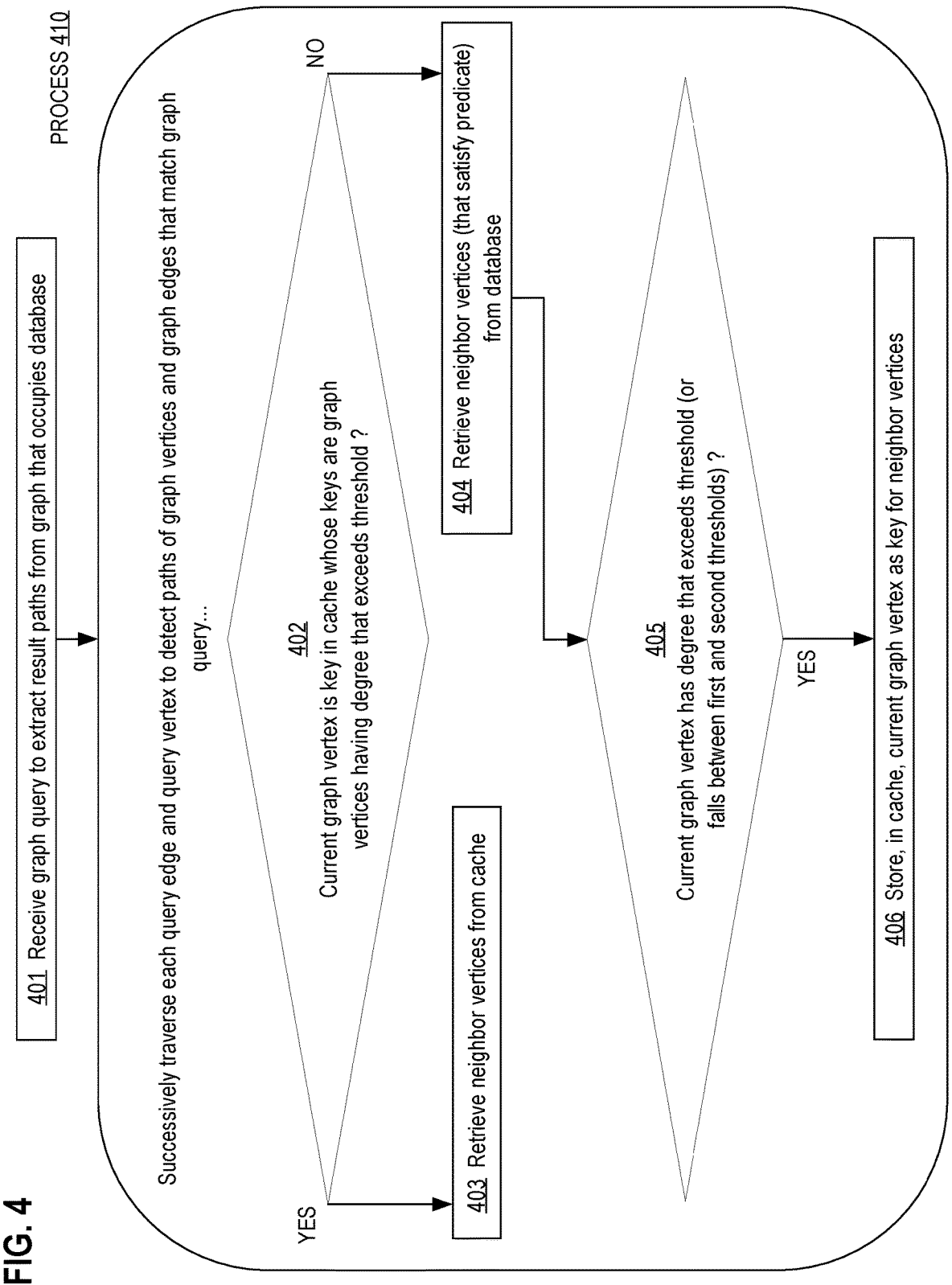
FIG. 4 is a flow diagram that depicts an example process that accelerates graph querying by caching neighbor vertices of super nodes, in an embodiment.

FIG. 4 is a flow diagram that depicts an example process 410 that accelerates graph querying by caching neighbor vertices of super nodes. Process 410 is discussed with reference to FIG. 1.

3.1 Preparation

Step 401 is preparatory. In step 401, a graph query to extract a set of result paths from a graph that occupies a database is received. For example, computer system 100 may host a graph engine that analyzes graph 150 that occupies database 140.

Computer system 100 may receive graph query 110 to extract matching paths from graph 150. For example, a remote client may submit graph query 110 to computer system 100 in a hypertext transfer protocol (HTTP) request, such as a simple object access (SOAP) or representational state (REST) request. Alternatively, computer system 100 may generate graph query 110.

3.2 Traversal

Query vertices 121-123 and query edges 131-132 sequentially form a query path. Computer system 100 matches the first query vertex, such as 121, to graph vertices of graph 150. These matching graph vertices are the starting vertices from which graph 150 may be traversed to find paths that match the query path.

Each traversal that is specified by the query path entails matching a query vertex and a query edge onto graph 150. Steps 402-406 are performed for each vertex+edge traversal pair in graph query 110. Traversing a query pair entails traversing from a current graph vertex, such as 163.

Step 402 detects whether a super node cache contains the current graph vertex as a key. For example, computer system 100 detects whether current graph vertex 163 is a key within cache 190. In Java embodiments, cache 190 is a java.util.Map that implements the containsKey( ) method.

3.2 Retrieval

Steps 403-404 are mutually exclusive. Which of steps 403-404 follows step 402 depends on whether the current graph vertex is a key within the super node cache.

If the current graph vertex is a key, then step 403 is performed. Otherwise, step 404 is performed.

In step 403, the edges and/or neighbors of the current graph vertex (super node) are retrieved from the cache. For example, current graph vertex 163 may be a super node and a key within cache 190.

Current graph vertex 163 is used as a lookup key to retrieve matching neighbors, such as 164-165 from cache 190. In Java embodiments, Map.get( ) may retrieve matching neighbors and/or edges, perhaps in an array or collection. In turn, each matching neighbor may recursively become the current graph vertex of the traversal.

However if the current vertex is not a key of cache 190, then step 404 is performed instead of step 403 for that current vertex. Because cache 190 lacks that super node (and its neighbors), those neighbors are retrieved from the database in step 404. For example, computer system 100 fetches (such as by query) graph edges 173-174 and/or graph vertices 164-165 from database 150.

The query may specify a predicate or condition that neighboring edges or vertices should satisfy (match). In embodiments, only a super node's neighboring edges or vertices that match the predicate are cached. For example, step 404 may retrieve only neighboring edges or vertices that match the predicate.

3.3 Population

Steps 405-406 perform additional processing that may further populate cache 190. Step 405 detects whether the degree of the current graph vertex exceeds a threshold. For example, computer system 100 may detect that current graph vertex 163 is a super node because it has more neighbors than the threshold.

In embodiments, step 405 detects whether the degree of the current graph vertex falls between a first threshold and a second threshold that protects cache 190 from being thrashed by a super node with too many edges. For example, cache 190 may have capacity to store a hundred edges. The first threshold may cause caching edges of a super node with fifty neighbors.

Whereas, the second threshold may prevent caching edges of another super node with a thousand neighbors. In embodiments, the second threshold does not apply to the count of neighbors, but instead applies to the count of neighboring edges or vertices that satisfy a condition or predicate. Predicates are discussed below.

Step 406 is performed only if the current graph vertex is a super node. In step 406, the current graph vertex is stored as a key for its edges and/or neighbors.

For example, computer system 100 may store the edges and/or neighbors as a retrievable value, along with the current graph vertex as a key, within cache 190. In Java embodiments, Map.put( ) may populate cache 190. Thus when the current graph vertex is later revisited, its edges and/or neighbors may be available without database I/O.

3.4 Cross Constraint

Query vertices 121-123 and query edges 131-132 encode constraints, criteria, or predicates of graph query 110. Some constraints are self-contained within a query vertex or edge. For example, query vertex 121 may match only blue graph vertices.

In contrast, a cross constraint may entail a relational join by specifying a comparison of properties of two graph components. For example graph query 110 may contain a predicate that specifies that query edge 131 has a color property whose value is the same as the value of a color property of query vertex 121.

In embodiments, step 406 is skipped (not performed) if the degree of the current vertex does not fall between first and second thresholds. In embodiments, step 406 is skipped if the current vertex is not a super node (degree exceeds first threshold) or if a cross constraint satisfies too many (exceeds second threshold) neighbor vertices or edges.

3.5 Lifecycle

The lifecycle and availability of cache 190 depends on the embodiment. In embodiments, a cache 190 is created whenever a graph query 110 is received and then discarded whenever executing that graph query 110 finishes. In embodiments, cache 190 may be recycled (cleared and reused) for different queries who executions do not temporally overlap.

In embodiments, each graph query 110 has its own cache 190. In embodiments, multiple graph queries 110 share a cache 190. In embodiments, multiple graph queries 110 share a cache 190 only if they share a graph 150.

In embodiments, each query vertex or query edge of graph query 110 may have its own cache 190. For example, after a given query vertex or edge has been exhaustively matched to graph 150, then the cache 190 of the given query vertex or edge may be discarded.

For example, after a given query vertex no longer occurs within a backtracking stack of a depth first search, then the cache 190 of the given query vertex or edge may be discarded. In these ways in embodiments, the lifecycle, sharing, and availability of one or more caches 190 may be configured to suit particular graph traversal paradigms.

3.6 Example Logic

The following Java logic may implement process 410, which may have other implementations:

```
0   static final int SUPER_NODE_THRESHOLD = 1000;
1   static final int REVISIT_THRESHOLD = 300;
2
3   List<Solution> process(Graph dataGraph, QueryPath queryPath) {
4     Iterator<QueryVertex> queryVertices = queryPath.getVertices( );
5     Iterator<QueryEdge> queryEdges = queryPath.getEdges( );
6     QueryVertex queryVertex = queryVertices.next( );
7
8     List<Solution> solutions = new List<>( );
9     for (DataVertex dataVertex : dataGraph.getVertices( )) {
10      if (dataVertex.matches(queryVertex)) {
11        Solution sol = new Solution( );
12        sol.put(queryVertex, dataVertex);
13        solutions.add(sol);
14      }
15    }
16
17    QueryVertex previousQueryVertex = queryVertex;
18
19    while (queryVertices.hasNext( )) {
20      QueryEdge queryEdge = queryEdges.next( );
21      QueryVertex queryVertex = queryVertices.next( );
22      List<Solution> newSolutions = new List<>( );
23      Map<DataVertex, List<DataVertex>> cache = new HashMap<>( );
24
25      for (Solutions sol : solutions) {
26        DataVertex previousDataVertex = sol.get(previousQueryVertex);
27        if (cache.contains(previousDataVertex)) {
28          List<DataVertex> matchesForQueryVertex = cache.get(previousDataVertex);
29          for (DataVertex dataVertex : matchesForQueryVertex) {
30            Solution newSol = sol.copy( );
31            newSol.put(queryVertex, dataVertex);
32            newSolutions.add(newSol);
33          }
34        }
35        else {
36          List<DataVertex> matchesForQueryVertex = new List<>( );
37          for (Neighbor nbr : previousDataVertex.getNeighbors( )) {
38            DataEdge dataEdge = nbr.getEdge( );
39            DataVertex dataVertex = nbr.getVertex( );
40            if (dataEdge.matches(queryEdge) && dataVertex.matches(queryVertex)) {
41              Solution newSol = sol.copy( );
42              newSol.put(queryVertex, dataVertex);
43              newSolutions.add(newSol);
44              matchesForQueryVertex.add(dataVertex);
45            }
46          }
47          if (previousDataVertex.getEdges( ).size( ) >= SUPER_NODE_THRESHOLD &&
48              matchesForQueryVertex.size( ) < REVISIT_THRESHOLD) {
49            cache.add(previousDataVertex, matchesForQueryVertex);
50          }
51        }
52      }
53      previous = queryVertex;
54      solutions = newSolutions;
55    }
56    return solutions;
57  }
```

4.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
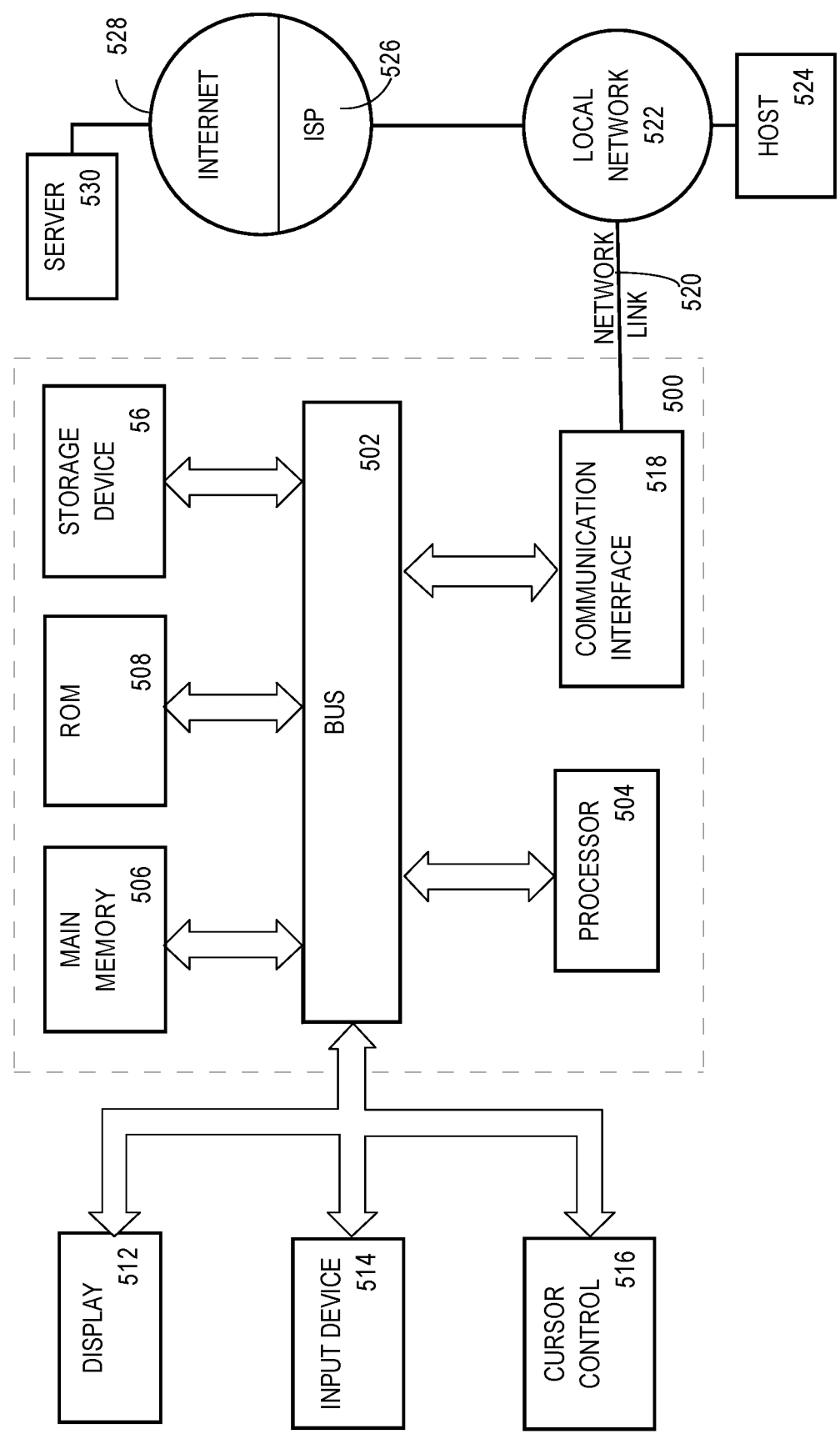
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 56, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 56. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 56. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 56 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 56, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
    receiving, by a computer, a graph query that analyzes a graph that does not reside in memory of the computer, wherein the graph comprises a plurality of vertices that are interconnected, wherein each vertex of the plurality of vertices comprises a set of vertex properties, wherein the graph query comprises at least one query criterion for at least one vertex property of the set of vertex properties;
    detecting whether a degree of a current vertex of the plurality of vertices exceeds a first threshold and does not exceed a second threshold;
    storing in response to detecting that the degree of the current vertex exceeds the first threshold and does not exceed the second threshold, in a cache in the memory of the computer, a plurality of neighbor vertices that are connected to the current vertex;
    generating, based on applying the at least one query criterion to at least one vertex of the plurality of neighbor vertices, a result for the graph query.

2. The method of claim 1 wherein:
    said computer is a single computer;
    said plurality of vertices that are interconnected comprises at least a trillion edges.

3. The method of claim 1 wherein:
said graph is a directed graph (digraph);
said degree of the current vertex consists of a count of edges that originate at the current vertex.

4. The method of claim 1 wherein said sets of vertex properties of the plurality of vertices are stored in a data store without indexing.

5. The method of claim 1 wherein said retrieving from the cache the plurality of neighbor vertices comprises retrieving from the cache only a subset of the plurality of neighbor vertices that reside within a backtracking stack of a depth first search (DFS) of said graph.

6. The method of claim 1 wherein said cache in the memory is discarded or cleared immediately after said generating said result.

7. The method of claim 6 wherein said cache in the memory is at least one selected from the group consisting of:
shared with queries whose executions do not temporally overlap, and
shared only with other graph queries that analyze same said graph.

8. One or more non-transitory computer-readable media storing instructions that, when executed by one or more processors, cause:
receiving a graph query that analyzes a graph that does not reside in computer memory, wherein the graph comprises a plurality of vertices that are interconnected, wherein each vertex of the plurality of vertices comprises a set of vertex properties, wherein the graph query comprises at least one query criterion for at least one vertex property of the set of vertex properties;
detecting whether a degree of a current vertex of the plurality of vertices exceeds a first threshold and does not exceed a second threshold;
storing in response to detecting that the degree of the current vertex exceeds the first threshold and does not exceed the second threshold, in a cache in the memory of the computer, a plurality of neighbor vertices that are connected to the current vertex;
generating, based on applying the at least one query criterion to at least one vertex of the plurality of neighbor vertices, a result for the graph query.

9. The one or more non-transitory computer-readable media of claim 8 wherein:
a single computer comprises said one or more processors;
said plurality of vertices that are interconnected comprises at least a trillion edges.

10. The one or more non-transitory computer-readable media of claim 8 wherein:
said graph is a directed graph (digraph);
said degree of the current vertex consists of a count of edges that originate at the current vertex.

11. The one or more non-transitory computer-readable media of claim 8 wherein said sets of vertex properties of the plurality of vertices are stored in a data store without indexing.

12. The one or more non-transitory computer-readable media of claim 8 wherein said retrieving from the cache the plurality of neighbor vertices comprises retrieving from the cache only a subset of the plurality of neighbor vertices that reside within a backtracking stack of a depth first search (DFS) of said graph.

13. The one or more non-transitory computer-readable media of claim 8 wherein said cache in the computer memory is
discarded or cleared immediately after said generating said result.

14. The one or more non-transitory computer-readable media of claim 13 wherein said cache in the memory is at least one selected from the group consisting of:
shared with queries whose executions do not temporally overlap, and
shared only with other graph queries that analyze same said graph.

15. One or more computers configured to:
receive a graph query that analyzes a graph that does not reside in computer memory, wherein the graph comprises a plurality of vertices that are interconnected, wherein each vertex of the plurality of vertices comprises a set of vertex properties, wherein the graph query comprises at least one query criterion for at least one vertex property of the set of vertex properties;
detect whether a degree of a current vertex of the plurality of vertices exceeds a first threshold and does not exceed a second threshold;
store in response to detecting that the degree of the current vertex exceeds the first threshold and does not exceed the second threshold, in a cache in the memory of the computer, a plurality of neighbor vertices that are connected to the current vertex;
generate, based on applying the at least one query criterion to at least one vertex of the plurality of neighbor vertices, a result for the graph query.

16. The one or more computers of claim 15 wherein:
said one or more computers consists of a single computer;
said plurality of vertices that are interconnected comprises at least a trillion edges.

17. The one or more computers of claim 15 wherein:
said graph is a directed graph (digraph);
said degree of the current vertex consists of a count of edges that originate at the current vertex.

18. The one or more computers of claim 15 wherein said sets of vertex properties of the plurality of vertices are stored in a data store without indexing.

19. The one or more computers of claim 15 wherein said retrieve from the cache the plurality of neighbor vertices comprises retrieve from the cache only a subset of the plurality of neighbor vertices that reside within a backtracking stack of a depth first search (DFS) of said graph.

20. The one or more computers of claim 15 wherein said cache in the computer memory is
discarded or cleared immediately after said generate said result.

* * * * *